United States Patent [19]

Traitler et al.

[11] Patent Number: 5,312,638

[45] Date of Patent: * May 17, 1994

[54] PROCESS FOR MAKING REDUCED-CALORIE ANIMAL FOODS

[75] Inventors: Helmut Traitler, Corseaux; Heike Winter, Vevey, both of Switzerland

[73] Assignee: Nestec S.A., Vevey, Switzerland

[*] Notice: The portion of the term of this patent subsequent to Nov. 23, 2010 has been disclaimed.

[21] Appl. No.: 992,842

[22] Filed: Dec. 16, 1992

[30] Foreign Application Priority Data

Jan. 9, 1992 [EP] European Pat. Off. ........ 92100261.4

[51] Int. Cl.$^5$ ............................................. A23L 1/308
[52] U.S. Cl. .................................... 426/531; 426/601; 426/611; 426/804; 426/635; 426/623
[58] Field of Search ............... 426/601, 611, 531, 804, 426/635, 623

[56] References Cited

U.S. PATENT DOCUMENTS 3,600,186  8/1971  Mattson et al. .
5,006,351  4/1991  Klemann et al. .
5,008,126  4/1991  Klemann et al. .

FOREIGN PATENT DOCUMENTS 0161114  11/1985  European Pat. Off. .
0405874   1/1991  European Pat. Off. .
0465689   1/1992  European Pat. Off. .

OTHER PUBLICATIONS

Mattson, et al., "Hydrolysis of fully esterified alcohols containing from one to eight hydroxyl groups by the lipolytic enzymes of rat pancreatic juice." Journal of Lipid Research, vol. 13 (1972) pp. 325–328.

Primary Examiner—Joseph Golian
Attorney, Agent, or Firm—Vogt & O'Donnell

[57] ABSTRACT

Reduced calorie animal food compositions are prepared by incorporating into a fat-containing food a caloric moderator selected from the group of 2,3-butanediol diesters of $C_{16-14\ 22}$ fatty acids.

7 Claims, 1 Drawing Sheet

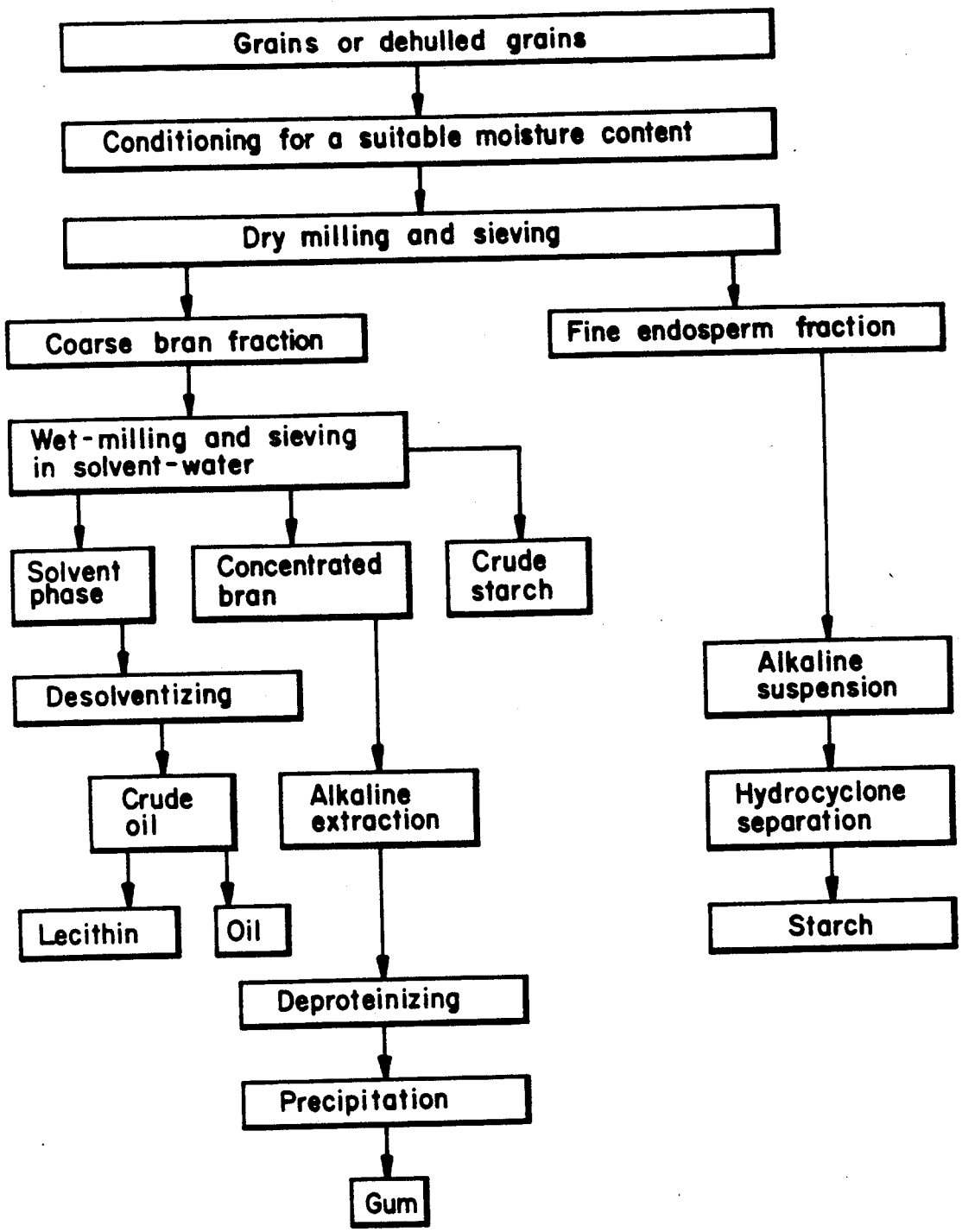

PROCESS FOR MAKING REDUCED-CALORIE ANIMAL FOODS

BACKGROUND OF THE INVENTION

The present invention relates to the use of a diester of 2,3-butanediol and fatty acids, more particularly $C_{16-22}$ fatty acids, as a calorie moderator in animal foods containing fats.

Compounds structurally similar to the diol diesters used in accordance with the invention are generally described in European Patent Application No. O161 114 as plant growth regulators. The esters of 2-methyl-1,4-butanediol and 1,3-propanediol with oleic, linoleic and linoleic acids are mentioned in particular.

SUMMARY OF THE INVENTION

The 2,3-butanediol diesters used in accordance with the invention and a process for their production are described in patent application European Patent Application Publication No. O465 689. The diol diesters may be used to replace all or part, for example 10 to 100%, of the fats typically included in the composition of animal foods, more particularly dog and cat foods, in dry or moist form (in the latter case in sterilized tins or containers).

In these foods, the diol diesters perferably make up from 3 to 20% by weight of the food.

Depending on the desired characteristics in conjunction with the application envisaged, the nature and distribution of the fatty acids of the diesters may be selected in dependence upon the technological and physicochemical parameters of the foods. Thus, in a preferred embodiment, palmitic, stearic, oleic and linoleic acids are predominant.

EXAMPLES

The invention is illustrated by the following Examples in which precentages are by weight, unless otherwise indicated.

EXAMPLE 1

A dry dog food is made from a base in dry form obtained by extrusion cooking of the ingredients in the following quantities:

| Ingredient | % |
| --- | --- |
| Rice | 44.04 |
| Meal from poultry waste | 30 |
| Corn gluten meal | 11.1 |
| Soya meal | 10.1 |
| Beef suet | 3 |
| Potassium chloride | 0.8 |
| Salt, iodized | 0.5 |
| Premix of vitamins | 0.05 |
| Premix of minerals | 0.01 |
| | 100 |

The above mixture is coated with the following ingredients in the quantities indicated:

| | % |
| --- | --- |
| Dry base mixture | 90 |
| Coating premix including semisolid to solid 2,3-butanediol diester having the following average fatty acid composition: $C_{16}:0$, 25%; $C_{18}:0$, 10%; $C_{18}:1$, 55% and $C_{18}:2$, 10% and an iodine index of 70 | 5 |
| Modified beef suet | 5 |
| | 100 |

EXAMPLE 2

A dry cat food is prepared in the same way as in Example 1 from a dry base having the following composition:

| Ingredient | % |
| --- | --- |
| Corn | 59.09 |
| Meal from poultry waste | 23 |
| Corn gluten meal | 12 |
| Soya meal | 5 |
| Dicalcium phosphate | 1 |
| Salt, iodized | 1 |
| Choline chloride | 0.3 |
| Premix of vitamins | 0.2 |
| Potassium chloride | 0.2 |
| Premix of minerals | 0.1 |
| Taurine | 0.1 |
| Ferrous sulfate | 0.01 |
| | 100 |

The above dry base is coated with a coating mixture in the following quantities:

| | % |
| --- | --- |
| Base mixture | 85 |
| 2,3-Butanediol diester used in Example 1 | 5 |
| Modified beef suet | 10 |
| | 100 |

EXAMPLE 3

A moist cat food is prepared in the form of a dispersion which is introduced into cans which are sealed and then sterilized in an autoclave. The dispersion has the following composition:

| Ingredient | % |
| --- | --- |
| 2,3-Butanediol diester used in Example 1 | 5 |
| Chicken necks and rears | 38.95 |
| Cows lung | 22.53 |
| Mechanically deboned beef | 4.54 |
| Guar gum | 0.35 |
| Kappa carrageenan | 0.10 |
| Premix of minerals | 0.31 |
| Premix of vitamins | 0.06 |
| Salt, non-iodized | 0.1 |
| Onion salt | 0.06 |
| Water | 28 |
| | 100 |

EXAMPLE 4

A tinned moist cat food is prepared as in Example 3 from the following ingredients:

| Ingredient | % |
| --- | --- |
| 2,3-Butanediol diester used in Example 1 | 5 |

-continued

| Ingredient | % |
| --- | --- |
| Cows liver | 5 |
| Pigs liver | 3 |
| Cows lung | 7 |
| Pigs lung | 6 |
| Pigs kidney | 5 |
| Fish | 13 |
| Sheeps lung | 6 |
| Soya isolate | 2 |
| Gelling agent | 0.55 |
| Guar gum | 0.2 |
| Nitrite | 0.4 |
| Titanium dioxide | 0.2 |
| Calcium bicarbonate | 0.3 |
| Premix of vitamins | 0.1 |
| Premix of minerals | 0.2 |
| Water | 46.05 |
|  | 100 |

We claim:

1. A process for preparing a reduced-calorie animal food composition comprising incorporating into a fat-containing animal food a caloric moderator selected from the group consisting of 2,3-butanediol diesters of $C_{16-22}$ fatty acids.

2. A process according to claim 1 wherein the caloric moderator is incorporated in an amount of from 3% to 20% by weight based upon the weight of the composition.

3. A process according to claim 1 wherein the fatty acids are selected from the group consisting of palmitic acid, stearic acid, oleic acid and linoleic aid.

4. A process according to claim 1 wherein the food composition is in a dry form.

5. A process according to claim 1 wherein the food composition is in a moist form.

6. A process according to claim 1 wherein the animal food is a dog food.

7. A process according to claim 1 wherein the animal food is a cat food.

* * * * *

UNITED STATES PATENT AND TRADEMARK OFFICE
CERTIFICATE OF CORRECTION

PATENT NO. : 5,312,638
DATED : May 17, 1994
INVENTOR(S) : Helmut TRAITLER, et al.

It is certified that error appears in the above-indentified patent and that said Letters Patent is hereby corrected as shown below:

In line 4, of the ABSTRACT, "$C_{16-14}$ aa" should be --$C_{16-22}$--.

Signed and Sealed this

Thirtieth Day of August, 1994

Attest:

BRUCE LEHMAN

*Attesting Officer*     *Commissioner of Patents and Trademarks*